United States Patent
de Perthuis (10) Patent No.: US 8,812,855 B2
(45) Date of Patent: Aug. 19, 2014

(54) SOFTWARE PROTECTION

(75) Inventor: Hugues de Perthuis, Garcelles (FR)

(73) Assignee: NXP B.V., Eindhoven (NL)

( * ) Notice: Subject to any disclaimer, the term of this patent is extended or adjusted under 35 U.S.C. 154(b) by 133 days.

(21) Appl. No.: 13/203,695

(22) PCT Filed: Mar. 1, 2010

(86) PCT No.: PCT/IB2010/050875
§ 371 (c)(1),
(2), (4) Date: Aug. 26, 2011

(87) PCT Pub. No.: WO2010/100598
PCT Pub. Date: Sep. 10, 2010

(65) Prior Publication Data
US 2011/0307961 A1 Dec. 15, 2011

(30) Foreign Application Priority Data
Mar. 2, 2009 (EP) .................... 09290148

(51) Int. Cl.
| G06F 21/00 | (2013.01) |
| G06F 21/64 | (2013.01) |
| G06F 21/12 | (2013.01) |
| G06F 21/51 | (2013.01) |
| H04L 29/06 | (2006.01) |
| H04L 9/06 | (2006.01) |
| G06F 9/30 | (2006.01) |
| G06F 21/54 | (2013.01) |
| G06F 21/50 | (2013.01) |
| G06F 21/60 | (2013.01) |

(52) U.S. Cl.
CPC ............. *G06F 21/64* (2013.01); *G06F 21/12* (2013.01); *G06F 21/125* (2013.01); *G06F 21/51* (2013.01); *G06F 21/50* (2013.01); *H04L 63/12* (2013.01); *H04L 9/0643* (2013.01); *G06F 21/60* (2013.01); *H04L 63/123* (2013.01); *G06F 9/30145* (2013.01); *G06F 9/3017* (2013.01); *G06F 21/54* (2013.01)
USPC ........... 713/176; 713/165; 713/167; 713/180; 726/26; 726/27; 726/30; 714/732

(58) Field of Classification Search
CPC ............ H04L 29/06; H04L 63/12; H04L 9/06
USPC ......... 713/151–152, 164–167, 176–181, 187; 726/16, 17, 21–30, 1, 2; 714/718–732
See application file for complete search history.

(56) References Cited

U.S. PATENT DOCUMENTS

| 5,701,315 A | 12/1997 | Pitot et al. |
| 5,956,429 A * | 9/1999 | Burns ........................... 382/245 |

(Continued)

FOREIGN PATENT DOCUMENTS

| CN | 10135055 A | 1/2009 |
| EP | 1 783 648 A1 | 5/2007 |

(Continued)

OTHER PUBLICATIONS

Steganography for Executables and Code Transformation Signatures by Anckaert et al; Publisher: Springer-Verlag Berlin Heidelberg; Year: 2005.*

(Continued)

Primary Examiner — Madhuri Herzog (57) ABSTRACT

A program (MC), which can be executed by a programmable circuit, is protected in the following manner. An instruction block (IB) is provided on the basis of at least a portion (MC-P) of the program. A protective code (DS) is generated that has a predefined relationship with the instruction block (IB). The instruction block (IB) is analyzed (ANL) so as to identify free ranges (FI) within the instruction block that are neutral with respect to an execution of the instruction block. The free ranges comprise at least one of the following types: bit ranges and value ranges. The free ranges that have been identified are used for embedding (SEB) the protective code (DS) within the instruction block (IB).

11 Claims, 5 Drawing Sheets

(56) References Cited

U.S. PATENT DOCUMENTS

| | | | |
|---|---|---|---|
| 7,024,663 B2 * | 4/2006 | Klein | 717/127 |
| 7,565,551 B2 * | 7/2009 | Kirovski | 713/189 |
| 8,650,402 B2 * | 2/2014 | Au et al. | 713/176 |
| 2004/0054955 A1 | 3/2004 | Riley | |
| 2005/0114629 A1 * | 5/2005 | Altman et al. | 712/209 |
| 2006/0277530 A1 | 12/2006 | Wu et al. | |
| 2007/0005992 A1 * | 1/2007 | Schluessler et al. | 713/193 |
| 2008/0028474 A1 | 1/2008 | Horne et al. | |
| 2009/0027439 A1 * | 1/2009 | Bauman | 347/19 |
| 2009/0113189 A1 * | 4/2009 | Myles | 712/226 |

FOREIGN PATENT DOCUMENTS

| | | |
|---|---|---|
| JP | 57-098047 A | 6/1982 |
| WO | 2005/052795 A1 | 6/2005 |

OTHER PUBLICATIONS

Hydan: Hiding Information in Program Binaries by El-Khalil et al; Publisher: Springer-Verlag Berlin Heidelberg; Year: 2004.*

Elbaz, R. et al. "A Parallelized Way to Provide Data Encryption and Integrity Checking on a Processor-Memory Bus", DAC 2006, $43^{rd}$ ACM/IEEE, 4 pgs. (Sep. 2006).

Larin, S. Y., et al. Compiler-Driven Cached Code Compression Schemes for Embedded ILP Processors, Micro-32, Proceedings of the $32^{nd}$ Annual ACM/IEEE International Symposium on Microarathitecture, IEEE Comp. Soc., pp. 82-92 (Nov. 1999).

Elbaz, R. et al. "TEC-Tree: A Low-Cost, Parallelizable Tree for Efficient Defense Against Memory Replay Attacks", In Proc. of the Workshop on Cryptographic Hardware and Embedded Systems 2007, CHES'07, pp. 289-302 (Sep. 2007).

International Search Report for Int'l Patent Appln. No. PCT/IB2010/050875 (Sep. 10, 2010).

* cited by examiner

FIG. 1

| 31 ............ 26 | 25 .......... 21 | 20 .......... 16 | 15 ...... 11 | 10 ........ 6 | 5 .................. 0 |
|---|---|---|---|---|---|
| OP | RS | RT | RD | SA | FU |

R                                FIG. 2A

| 31 ............ 26 | 25 .......... 21 | 20 .......... 16 | 15 .................................. 0 |
|---|---|---|---|
| OP | RS | RT | IM |

I                                FIG. 2B

| 31 ............ 26 | 25 ............................................................... 0 |
|---|---|
| OP | TG |

SOFTWARE PROTECTION

FIELD OF THE INVENTION

An aspect of the invention relates to a method of protecting a program that can be executed by a programmable circuit. The method may be applied, for example, to prevent unauthorized use of software or unauthorized modification, or both. Other aspects of the invention relate to a processor for protecting a program, a data stream comprising a protected program, a method of processing a protected program, a processor for processing a protected program, and a computer program product.

BACKGROUND OF THE INVENTION

A software program is typically developed in a high-level programming language that is descriptive. This development, writing of software, provides a source code version of the software program. A compiler compiles this source code version so as to obtain a machine code version of the software program. The machine code version is typically a sequence of instructions that can be executed by a programmable circuit. A machine code instruction is typically in the form of a series of bits, for example, 32 bits, that complies with a particular syntax.

Generally, the machine code version of a software program is commercialized, and accordingly disclosed, rather than the source code version, which may be kept confidential. For example, machine code may be commercialized together with a processor into which the machine code has been loaded. Machine code may also be commercialized individually by means of, for example, a storage medium in which the machine code is stored, or by means of a server from which the machine code can be downloaded.

However, machine code is vulnerable to so-called hacking. For example, a fraudulent person may disable or bypass a security function comprised in the machine code for the purpose of unauthorized cloning or unauthorized software upgrading. Hacking typically involves modifying the machine code so as to cause a processor, which executes the machine code, to carry out undesired actions. These actions may include revealing information about the machine code and any security function comprised therein, as well as modifying or bypassing security functions and otherwise modifying processor behavior. Such a deliberate modification of the machine code is often referred to as an "attack", which may be of a physical or a logical nature. An example of a physical attack is exposing the processor that executes the machine code to strong light or another type of radiation. An example of a logical attack is inserting code through an addressable buffer memory within the processor. Other logical attacks may involve overflowing a buffer, or making use of a software bug, or both.

The international application published under number WO 2005/052795 describes a method of securing or verifying a program that can be executed in a data processing unit. An error code or check code is generated for each command in the program. The check code is added to each command. In a data processing unit, a verification of the check code is carried out immediately prior to the execution of the command. The command is executed in the data processing unit, once the authenticity of the command has been confirmed.

SUMMARY OF THE INVENTION

There is a need for improved software protection, which can be achieved at relatively moderate cost.

In accordance with an aspect of the invention, a program, which can be executed by a programmable circuit, is protected in the following manner. An instruction block is provided on the basis of at least a portion of the program. A protective code is generated that has a predefined relationship with the instruction block. The instruction block is analyzed so as to identify free ranges within the instruction block that are neutral with respect to an execution of the instruction block. The free ranges comprise at least one of the following types: bit ranges and value ranges. The free ranges that have been identified are used for embedding the protective code within the instruction block.

For example, an instruction may comprise a series of bits that is neutral with respect to an execution of the instruction. That is, the series of bits concerned does not have any influence on what happens when the instruction is executed. Such a series of bits may therefore be designated as a free range. A series of bits may constitute a field of the instruction. A single bit may also constitute a free range. As another example, an instruction may comprise a field that can accommodate for a range of values. A portion of this range of values can be neutral with respect to an execution of the instruction. That is, the values concerned have no specified meaning. Such a set of values may therefore be designated as a free range.

According to the invention, free ranges are used for embedding a protective code in an instruction block, rather than appending the protective code to the instruction block. This makes it possible to protect a program without a substantial increase in amount of data, or even without any increase. It obviates a need for additional memory capacity in a programmable circuit, which is arranged to execute machine code that has been protected in accordance with the invention. A given program memory that has sufficient capacity for storing a given conventional unprotected machine code program, will typically also have sufficient capacity for storing a protected version of this program, which has been obtained in accordance with the invention. Moreover, relatively few modifications, which are generally uncomplicated, are sufficient for adapting a conventional programmable circuit, allowing this circuit to handle machine code that has been protected in accordance with the invention. Software protection can thus be achieved at relatively moderate cost.

An implementation of the invention advantageously comprises one or more of the following additional features, which are described in separate paragraphs that correspond with individual dependent claims.

Entropy coding is preferably applied to instructions comprised in the program to be protected, so as to create free ranges within an instruction block into which the protective code is embedded. Accordingly, the instruction block comprises entropy-coded versions of the instructions that are present in the program to be protected. The entropy encoding, which creates free ranges, may provide sufficient space for embedding the protective code without any increase in amount of data, or a relatively modest increase only. This contributes to cost efficiency.

An instruction may be reformatted otherwise so as to create free ranges. A value indication can be included in a free range that is available in a portion of the program from which an instruction block is composed. The value indication indicates that respective given bits of an instruction in that portion have respective given values. In the analysis step, these respective given bits are then identified as a free range. Accordingly, a relatively small free arranged can be given up, as it were, in order to obtain a larger free range.

The value indication can indicate that the instruction comprises a group of bits that each have a given value. The group of bits is then identified as a free range.

At least one dummy instruction can be included in the instruction block. This allows ensuring that there is sufficient space, as it were, in the instruction block for embedding the protective code. Notwithstanding, it is generally preferred to reformat instructions in order to obtain sufficient space.

The protective code can be generated as follows. A hash code is generated from a data set that includes the instruction block. A digital signature is generated from the hash code and a key. The protective code thus generated allows a verification of integrity and authenticity.

The data set from which hash code is generated preferably includes a data element representative of an address from which a given instruction in the instruction block should be executed. This prevents a hacker from moving valid instructions, which enhances protection.

The instruction block can correspond in size with a unit of access to a cache memory, which is associated with the programmable circuit that can execute the program.

The instruction block can comprise a sequence of instructions that are to be carried out consecutively. This implies that the instruction block is based on a portion of the program that is free of any jumps that occur before the end of the portion concerned.

A detailed description, with reference to drawings, illustrates the invention summarized hereinbefore as well as the additional features.

DETAILED DESCRIPTION OF THE EMBODIMENTS

Figure 1:
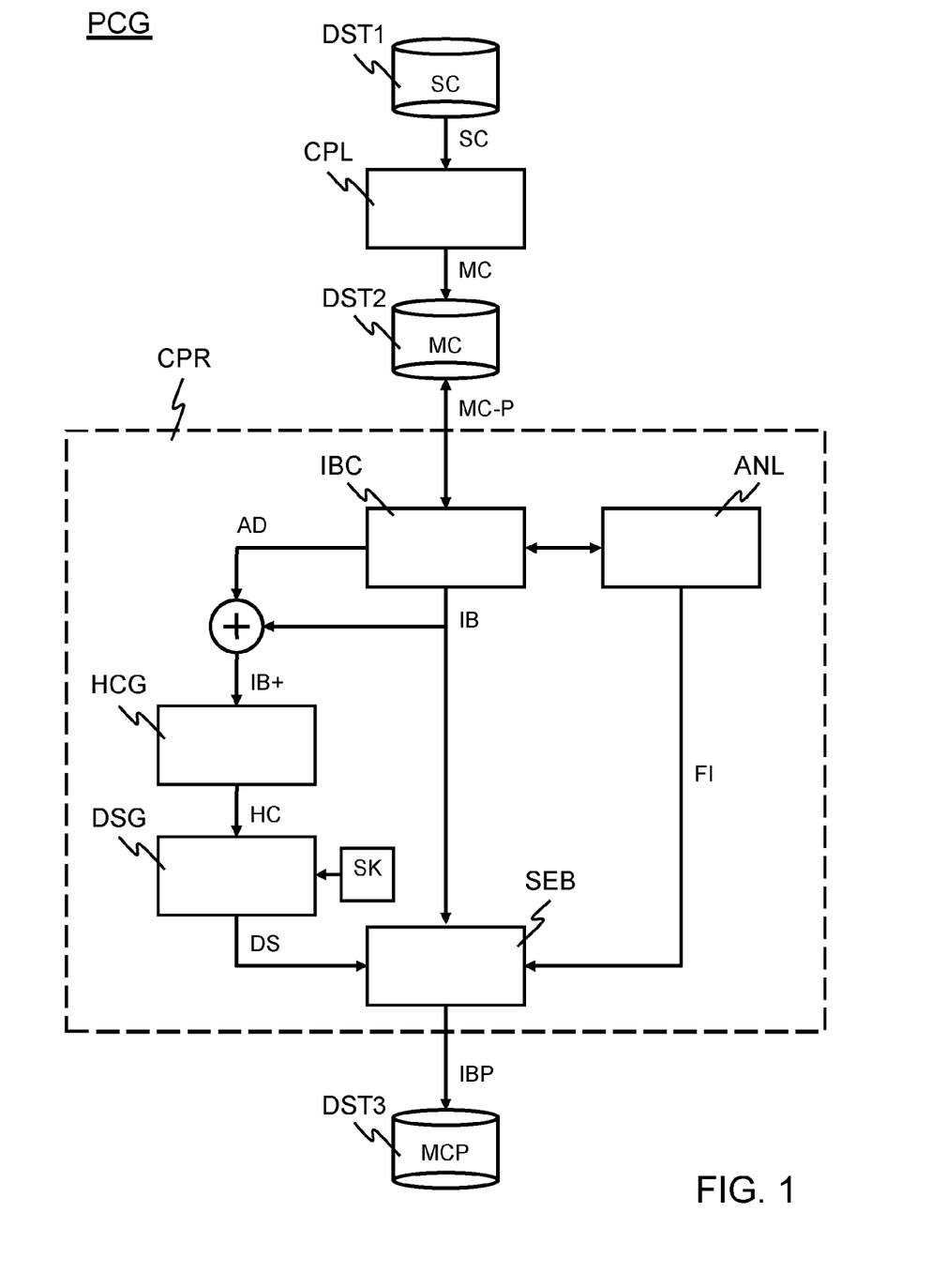
FIG. 1 is a block diagram that illustrates a protected code generator.

FIG. 1 illustrates a protected code generator PCG. The protected code generator PCG comprises a compiler CPL, a code protector CPR, and various data storage spaces DST1, DST2, DST3. The compiler CPL and the code protector CPR may each be implemented by means of, for example, a suitably programmed processor. The data storage spaces DST1, DST2, DST3 may form part of a single physical storage medium such as, for example, a hard disk or a solid-state memory circuit. As another example, each data storage space may be comprised in a separate physical storage medium.

The code protector CPR comprises various functional modules: an instruction block composer IBC, an analyzer ANL, a hash code generator HCG, a digital signature generator DSG, and a signature-embedding module SEB. Each of these functional modules may be implemented by means of, for example, a set of instructions that has been loaded into a programmable processor. In such a software-based implementation, the set of instructions defines operations that the functional module concerned carries out, which will be described hereinafter. In this respect, FIG. 1 can be regarded to represent a method, whereby the compiler CPL represents a compilation step, the instruction block composer IBC represents an instruction block composition step, the analyzer ANL represents an analysis step, the hash code generator HCG represents a hash code generation step, the digital signature generator DSG represents a digital signature generation step, and the signature-embedding module SEB represents a signature-embedding step.

The protected code generator PCG basically operates as follows. Data storage space DST1 comprises a source code version SC of a software program. The compiler CPL compiles this source code version SC so as to obtain a machine code version MC of the software program. Data storage space DST2 stores this machine code version MC, at least temporarily. The source code version SC and the machine code version MC of the software program will hereinafter be referred to as source code SC and machine code MC, respectively, for the sake of conciseness.

It is typically the machine code MC that is commercialized and, accordingly, disclosed rather than the source code SC, which may be kept confidential. For example, the machine code MC may be commercialized together with a processor into which the machine code MC has been loaded. The machine code MC may also be commercialized individually by means of, for example, a storage medium in which the machine code MC is stored, or by means of a server from which the machine code MC can be downloaded.

However, the machine code MC is vulnerable to so-called hacking. For example, a fraudulent person may disable or bypass a security function comprised in the machine code MC for the purpose of unauthorized cloning or unauthorized software upgrading. Hacking typically involves modifying the machine code MC so as to cause a processor, which executes the machine code MC, to carry out undesired actions. These actions may include revealing information about the machine code MC and any security function comprised therein, as well as modifying bypassing security functions and otherwise modifying processor behavior. Such a deliberate modification of the machine code is often referred to as an "attack", which may be of a physical or a logical nature. An example of a physical attack is exposing the processor that executes the machine code MC to strong light or another type of radiation. An example of a logical attack is inserting code through an addressable buffer memory within the processor. Other logical attacks may involve overflowing a buffer, or making use of a software bug, or both. The protected code generator PCG illustrated in FIG. 1 provides protection against such hacking in an efficient manner.

The instruction block composer IBC provides successive instruction blocks IB on the basis of successive portions MC-P of the machine code MC, which is present in data storage space DST2. A machine code portion MC-P is in itself a sequence of instructions. An instruction block IB may exactly correspond with a machine code portion MC-P. That is, the instruction block IB may be identical to the machine code portion MC-P. An instruction block IB may also correspond with a machine code portion MC-P to which one or more dummy instructions have been added. A dummy instruction is typically a so-called "nop" instruction, "nop" being a mnemonic for No Operation. An instruction block IB may also comprise an instruction that is a modified version of an instruction comprised in the machine code portion MC-P on which the instruction block IB is based. That is, the instruction block composer IBC may reformat one or more instructions that form part of the machine code MC. This reformatting may involve entropy encoding, in particular entropy encoding of so-called opcodes in the instructions. This will be described in greater detail hereinafter.

An instruction block IB may comprise a fixed number of instructions, such as, for example, 8 instructions. In that case, the instruction block IB preferably corresponds in size with a unit of access of a cache memory. Such a unit of access is typically a so-called cache line, which can accommodate for a given number of instructions, but it may also be, for example, a multiple of cache lines. Alternatively, an instruction block IB may comprise a variable number of instructions. For example, an instruction block IB may comprise a sequence of instructions comprised between two branches in the software program concerned. The software program may be such that there are typically 7 to 10 instructions between two branches.

The analyzer ANL controls the instruction block composer IBC so as to ensure that an instruction block IB can accommodate for a given minimum amount of additional data. This implies that the analyzer ANL decides whether the instruction block composer IBC should add one or more dummy instructions to a machine code portion MC-P, or not, in order to provide an instruction block IB. In general, it holds that the greater the number of dummy instructions comprised in the instruction block IB, the greater the amount of additional data the instruction block IB can accommodate for.

However, adding dummy instructions entails drawbacks and should therefore be avoided to the extent possible. First of all, an extended version of the machine code MC will be obtained that requires a greater memory space in a processor that needs to execute the machine code, or rather the extended version thereof. Secondly, any jump instruction subsequent to an added dummy instruction should be modified. Jump addresses should be adapted. This is rather cumbersome process, which entails additional cost, and which may be a source of error.

The analyzer ANL provides a free range indication FI that applies to an instruction block IB, which the instruction block composer IBC provides. The free range indication FI indicates so-called free ranges within the instruction block IB that can accommodate for additional data. A free range may be, for example, a range of bits in an instruction whose respective values have no influence on the execution of the instruction concerned. That is, the execution of the instruction is indifferent with respect to the respective values of the respective bits concerned. Consequently, the analyzer ANL may label a bit that constitutes such a "do not care" value as a free range. In case successive bits in an instruction constitute "do not care" values, the analyzer ANL may collectively label these successive bits as a free range.

A free range may also be, for example, a range of values, which can be assigned to a set of successive bits in an instruction, but which has no influence on the execution of the instruction concerned. That is, the range of values is unused in the sense that a value from this range has no particular meaning. The execution of the instruction is thus indifferent with respect to any particular value from the range of values concerned. Consequently, the analyzer ANL may label a range of such unused values as a free range. For example, let it be assumed that an instruction comprises a 6-bit field for which 29 different values have been defined. Since 6 bits correspond with 64 different values, this means that 35 values are effectively unused. These 35 unused values constitute a free range that can accommodate for slightly more than 1 bit worth of information. Operations that the analyzer ANL carries out for identifying free ranges will be described in greater detail hereinafter.

The hash code generator HCG applies a hash function to a complemented instruction block IB+. A complemented instruction block IB+ is obtained by adding a representative address AD to an instruction block IB, which the instruction block composer IBC provides. The representative address AD represents an address of an instruction within the instruction block IB from which the instruction concerned should be executed. For example, the representative address AD may be the address from which the first instruction in the instruction block IB should be executed, or only a portion of this address.

The instruction block composer IBC may determine the representative address AD as an address relative to a start address for the machine code MC. The representative address AD of an instruction block IB may correspond with, for example, the number of instructions comprised in all instruction IB blocks that the instruction block composer IBC has provided thus far on the basis of the machine code MC. The representative address AD may also be a portion of such a relative address, such as, for example, the 20 least significant bits (LSB) of a relative address. It is preferred that the representative address has a granularity that is sufficiently large to prevent hacking while allowing some margin for moving instructions inside a memory.

The hash code generator HCG provides a hash code HC that is generated by applying the hash function to a complemented instruction block IB+. The hash code HC comprises a fixed number of bits irrespective of the number of bits comprised in the complemented instruction block IB+, which may be fixed or variable. For example, let it be assumed that the hash function is the hash function known as "SHA-2" is used (SHA is an acronym for Secure Hash Algorithm). In that case, the hash code HC comprises 256 bits irrespective of the number of instructions comprised in the complemented instruction block IB+, which number may be, for example, 8 or 9.

The hash function is preferably of the cryptographic type, which implies the hash function is one-way and collision free. One-way means that it is computationally infeasible to find an input "x" such that H(x) is equal to the hash code HC, H representing the hash function. Collision free means that it is computationally infeasible to find a code "y" that is different from the complemented instruction block IB+ such that H(y) is equal to hash code HC. Then H is said to be a weakly collision-free hash function. A strongly collision-free hash function H is one for which it is computationally infeasible to find any two messages x and y such that H(x)=H(y). The hash code HC can therefore be regarded as a digital fingerprint of the complemented instruction block IB+.

The digital signature generator DSG applies a signing algorithm to the hash code HC to produce a digital signature DS on the basis of a secret key SK. The secret key SK is a secret digital code that is securely stored in the protected code generator PCG. It is computationally infeasible to generate the digital signature DS without having the secret key SK. The digital signature DS thus allows certifying authenticity and integrity of the complemented instruction block IB+. That is, the digital signature DS can warrant authorship of the complemented instruction block IB+ and absence of any modification of data comprised therein. The digital signal generator preferably applies an asymmetric cryptographic scheme, which implies a public-private key pair. In case such a scheme is used, the secret key SK is a private key, which has a corresponding public key. The public key allows generating the hash code HC from the digital signature DS, but not the other way around.

The signature-embedding module SEB embeds the digital signature DS in the instruction block IB from which the digital signature DS has been generated. To that end, the signature-embedding module SEB uses the free range indication FI that the analyzer ANL provides, which has identified the free ranges present in the instruction block IB. As explained hereinbefore, the analyzer ANL controls the instruction block composer IBC so that the instruction block IB can accommodate for the digital signature DS. That is, the analyzer ANL guarantees that the free ranges in the instruction block IB provide sufficient space, as it were, for successfully embedding the digital signature DS. This will be explained in greater detail hereinafter.

The code protector CPR illustrated in FIG. 1 thus generates successive protected instruction block IBP from successive portions MC-P of the machine code MC. A protected instruction block IBP is an instruction block IB in which a digital signature DS has been embedded as described hereinbefore. The successive protected instruction blocks IBP that the code protector CPR generates are written into data storage space DST3. The successive protected instruction blocks IBP collectively constitute a protected version of the machine code MC, that is, a protected machine code MCP.

Figure 2A:
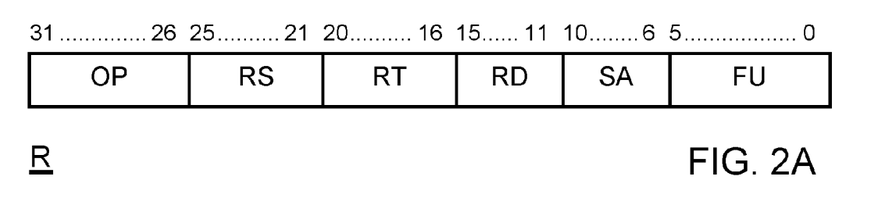
FIGS. 2A, 2B, and 2C are bit diagrams that illustrate different types of machine code instructions, which may be protected in the protected code generator.
Figure 2B:
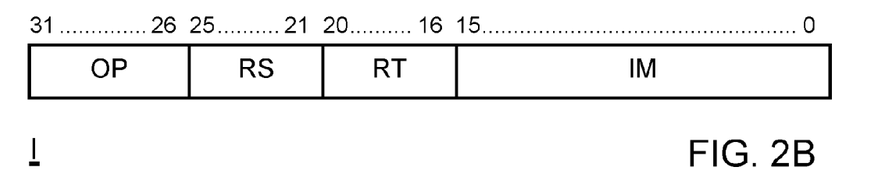
Figure 2C:
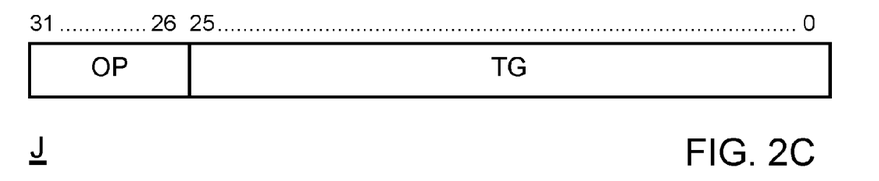

FIGS. 2A, 2B, and 2C illustrate three different types of instructions that the machine code MC may comprise in case the machine code MC is intended for a MIPS processor (MIPS is an acronym for Microprocessor without Interlocked Pipeline Stages and a registered trademark of MIPS Technologies, Inc., US). FIG. 2A illustrates an R-type instruction; FIG. 2B illustrates an I-type instruction; and FIG. 2C illustrates a J-type instruction. Each type of instruction comprises 32 bits, which are represented by numerals in a range comprised between 0 and 31 that are arranged in a horizontal direction in FIGS. 2A, 2B, and 2C. Numeral 31 represents the most significant bit of an instruction; numeral 0 represents the least significant bit.

The R-, I-, and J-type instructions each comprise an opcode OP that ranges from bit 26 to bit 31, which is the most significant bit. That is, the opcode OP constitutes a 6-bit field. The opcode OP of an instruction comprises a 6-bit value that identifies the instruction concerned. Bits 26-31 are instruction-identifying bits.

The R-type instruction illustrated in FIG. 2A comprises various fields in addition to the opcode OP: an RS field that ranges from bit 21 to 25, an RT field that ranges from bit 16 to 20, an RD field that ranges from bit 11 to 16, an SA field that ranges from bit 6 to 10, and an FU field that ranges from bit 0 to 5. The opcode OP of the R-type instructions is 000000, which means that each of the bits 31 to 26 is equal to 0. The FU field defines a function. There are 29 different functions. Since the FU field comprises 6 bits, which corresponds to 64 different values, this means that 35 values are effectively unused. Consequently, the FU field comprises a free range that can accommodate for an amount of information that is slightly more than 1 bit. The following provides some examples of free ranges that can be found for various functions that the FU field may specify.

In case the FU field specifies an "and" function whereby the RS, RT, and RD fields constitute operands, the SA field is not used. Consequently, in that case, the SA field constitutes a free range that can accommodate for 5 bits of information.

In case the FU field specifies a "break" function ("break" is a mnemonic for Breakpoint), none of the fields RS, RT, RD and SA are used. Consequently, in that case, the aforementioned fields constitute a free range that can accommodate for 20 bits of information.

In case the FU field specifies a "div" function ("div" is a mnemonic for Divide Words), whereby the RS and RT, and fields constitute operands, the RD and SA fields are not used. Consequently, in that case, the aforementioned fields constitute a free range that can accommodate for 10 bits of information.

The I-type instruction illustrated in FIG. 2B comprises various fields in addition to the opcode OP: an RS field that ranges from bit 21 to 25, an RT field that ranges from bit 16 to 20, an IM field that ranges from bit 15 to 0. The opcode OP of the I-type may have any 6-bit value, except the following values: 000000, 00001*, and 0100**, * representing an arbitrary bit value, which can be either 0 or 1. The following provides some examples of free ranges that can be found for various operations that the opcode OP may specify.

In case the opcode OP specifies an "andi" operation ("andi" is a mnemonic for And Immediate) whereby the RS, RT, and IM fields constitute operands, there does not appear to be any unused bit or value. Consequently, in that case, there does not appear to be any free range.

In case the opcode OP specifies a "bgez" operation ("bgez" is a mnemonic for Branch on Greater Than or Equal to Zero) whereby the RS and IM fields constitute operands, the RT field is unused. Consequently, in that case, the RT field constitutes a free range that can accommodate for 5 bits of information.

Similarly, in case the opcode OP specifies a "lui" operation ("lui" is a mnemonic for Load Upper Immediate) whereby the RS and IM fields constitute operands, the RT field is unused. Consequently, in that case, the RT field constitutes a free range that can accommodate for 5 bits of information.

The J-type instruction illustrated in FIG. 2C comprises a TG field in addition to the opcode OP. The TG field ranges from bit 25 to 0. Bits 1 and 0 are always equal to 1, because J-type instructions are word aligned. Consequently, a J-type instruction comprises at least one free range that can accommodate for 2 bits of information.

Figure 3:
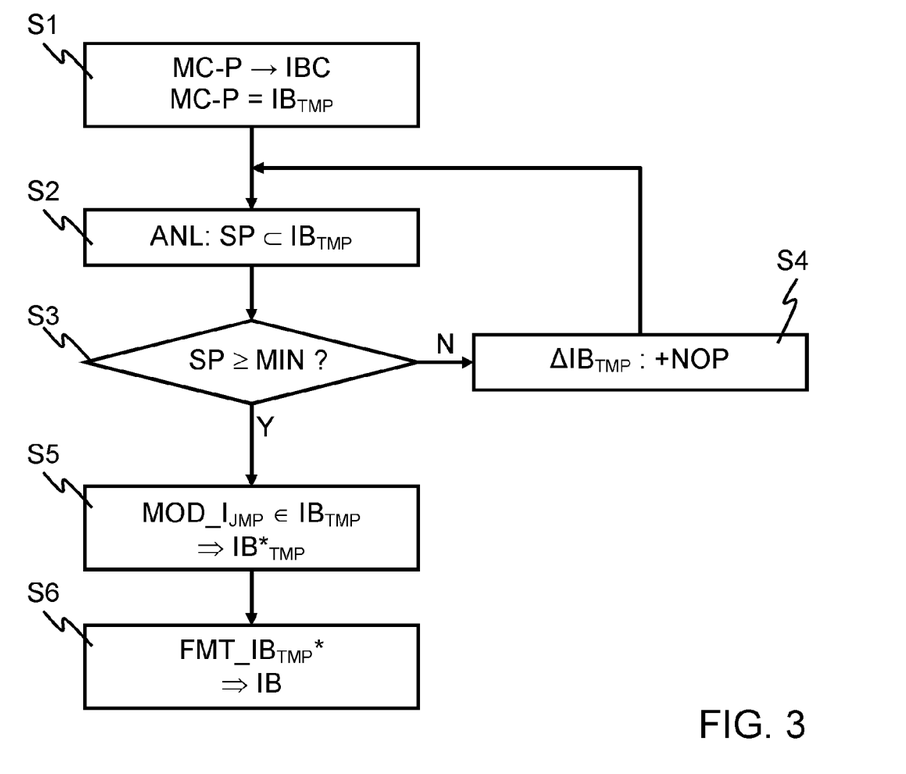
FIG. 3 is a flow chart diagram that illustrates a series of steps that are carried out within the protected code generator for the purpose of forming an instruction block that will be protected.

FIG. 3 illustrates a series of steps S1-S6 that the instruction block composer IBC and the analyzer ANL can carry out for the following two purposes. Firstly, an instruction block IB is provided in which there is sufficient space to accommodate for the digital signature DS that will be generated for the instruction block IB. Secondly, along with the instruction block IB, a free range indication FI is provided, which indicates free ranges that constitute the aforementioned space. As indicated hereinbefore, the instruction block composer IBC and the analyzer ANL may be implemented by means of a programmable processor. FIG. 3 may therefore be regarded as a flowchart representation of a software program, that is, a set of instructions, which enables the programmable processor to carry out various operations described hereinafter with reference to FIG. 3.

In step S1, the instruction block composer IBC fetches a portion MC-P of the machine code from data storage space DST2 (MC-P→IBC). The machine code portion MC-P that is fetched is typically subsequent to the portion of the machine code on the basis of which the most recent instruction block has been provided. The machine code portion MC-P constitutes an initial version of a provisional instruction block $IB_{TMP}$, which will be subject to steps S1-S5 described hereinafter (MC-P=$IB_{TMP}$).

In step S2, the analyzer ANL determines an amount of additional data that can be accommodated for in the provisional instruction block $IB_{TMP}$ (ANL: SP⊂$IB_{TMP}$). The amount of additional data that can be accommodated for will hereinafter be referred to as available space for reasons of convenience. The analyzer ANL can determine the available space in the following fashion. The analyzer ANL can recognize an instruction on the basis of the opcode OP of the instruction, or another code comprised in the instruction. The available space, which may be expressed in terms of number of bits, can be predetermined for each type of instruction as described hereinbefore with reference to FIGS. 2A, 2B, and 2C. Having recognized an instruction, the analyzer ANL can then immediately determine the available space in the instruction.

For example, the analyzer ANL may comprise a table specifying respective free ranges for respective instructions. The table may be generated in advance for a particular instruction set, such as, for example, the MIPS instruction set described hereinbefore with reference to FIGS. 2A, 2B, and 2C. That is, the table results from a free range analysis of this instruction set as described hereinbefore. The analyzer ANL may thus use the table to determine an available number of bits that the free ranges provide for each instruction comprised in the provisional instruction block $IB_{TMP}$. The analyzer ANL may then calculate a sum of these available numbers of bits that have been determined. This sum represents the available space in the provisional instruction block $IB_{TMP}$.

The analyzer ANL preferably takes into account any reformatting that one or more instructions in the provisional instruction block $IB_{TMP}$ may undergo. This reformatting, which will be described hereinafter, allows increasing available space. That is, a reformatted instruction, which is obtained by reformatting an instruction in the machine code MC, typically comprises a higher number of available bits than the instruction in the machine code MC. The analyzer ANL then preferably calculates the available space in the provisional instruction block $IB_{TMP}$ on the basis of the higher number of available bits. This higher number of available bits can be predetermined because reformatting is a deterministic operation.

In step S3, the analyzer ANL verifies whether the available space in the provisional instruction block $IB_{TMP}$ is at least equal to a minimum amount, or not (SP≥MIN ?). In case the available space is smaller than the minimum amount, the analyzer ANL subsequently carries out step S4. In case the available space is equal to or greater than the minimum amount, the analyzer ANL subsequently carries out step S5. The minimum amount corresponds with an amount of data comprised in the digital signature DS that will be generated. The amount of data comprised in the digital signature DS, which may be expressed in terms of number of bits, is preferably fixed. Such a fixed amount can be guaranteed because the hash code HC generator HCG generates hash code HCs that comprise a given fixed number of bits. The digital signature generator DSG preferably does not modify this number of bits: the digital signature DS has the same size as the hash code HC.

In step S4, the analyzer ANL replaces an instruction in the provisional instruction block $IB_{TMP}$ by a dummy instruction such as, for example, a "nop" instruction ($\Delta IB_{TMP}$: +NOP). The instruction that is replaced is preferably an instruction that is not a dummy instruction itself and that is last in sequence. The last non-dummy instruction is effectively deleted from the portion of the machine code MC that has been fetched in step S1. This deleted instruction will form part of a subsequent portion of the machine code MC that will be fetched when the series of steps S1-S6 is carried out anew so as to provide a subsequent instruction block IB. That is, the deleted instruction will be represented in the subsequent instruction block IB.

Accordingly, step S4 provides a new provisional instruction block $IB_{TMP}$ by replacing the last non-dummy instruction by a dummy instruction. Subsequently, the analyzer ANL carries out step S2 and step S3 subsequent thereto, in order to verify whether the available space in the new provisional instruction block $IB_{TMP}$ is sufficient to accommodate for the digital signature DS, or not. If not, step S4 is repeated, meaning that a further non-dummy instruction is replaced by a dummy instruction. Each such replacement is effectively an insertion of a dummy instruction into the machine code MC. The analyzer ANL keeps track of a total number of dummy instructions that have been inserted.

In step S5, the analyzer ANL adapts any jump instruction that may be present in the provisional instruction block $IB_{TMP}$ (MOD_$I_{JMP} \in IB_{TMP}$). The insertion of one or more dummy instructions requires an adaptation of jump addresses. This adaptation is based on the total number of dummy instructions that have been inserted. For example, let it be assumed that successive instruction blocks IB have already been provided and that, in total, N dummy instructions have been inserted thus far in doing so, N being an integer number. In that case, there is an address offset equal to N, which should be accounted for in a jump instruction that is present in the provisional instruction block $IB_{TMP}$. This can be done by incrementing the jump address of the jump instruction by N. Accordingly, step S5 thus provides an adapted provisional instruction block $IB*_{TMP}$, which accounts for the insertion of dummy instructions.

In step S6, the instruction block composer IBC subjects the adapted provisional instruction block $IB*_{TMP}$ to a reformatting operation in order to obtain the instruction block IB into which the digital signature DS will be embedded (FMT_$IB_{TMP}* \Rightarrow$ IB). That is, the instruction block composer IBC may reformat one or more instructions in order to create additional space for embedding the digital signature DS. As mentioned hereinbefore, a reformatted instruction typically comprises a higher number of available bits than the corresponding instruction in its original form.

For example, the reformatting operation in step S6 may involve entropy coding of opcodes. Respective opcodes are mapped to respective variable length codes. The opcode of an instruction that occurs relatively frequently in the machine code MC is mapped to a relatively short variable length code. Conversely, the opcode of an instruction that occurs rarely in the machine code MC can be mapped to a relatively long variable length code. The variable length codes may be placed in an instruction field that originally comprised the opcodes such as, for example, the 6-bit field OP illustrated in FIGS. 2A, 2B, and 2C. The instruction field may be extended by one or more bits, to accommodate for the variable length codes, if so required. It should be noted that fields other than opcodes may also undergo entropy coding for the purpose of creating additional fee ranges.

Entropy coding is typically characterized by a particular scheme, an entropy encoding scheme, which defines correlations between the opcodes and the variable length codes. Different schemes will typically provide different gains for a given machine code in terms of additional space, free ranges, which can be created. This is because a given instruction that occurs relatively frequently in a machine code, may occur less frequently in another machine code. It is therefore preferred to determine the entropy encoding scheme that provides the highest gain for a given machine code, and to apply this optimal entropy encoding scheme in step S6. In case the entropy encoding scheme is not predetermined, the entropy encoding scheme that has been applied needs to be communicated, in one way or another, to processors that will execute the protected machine code concerned. For example, a suitable indication may be included in the protected machine code MCP illustrated in FIG. 1.

Another form of reformatting is as follows. Let it be assumed that a particular instruction occurs relatively frequently in the machine code MC. Let it further be assumed that each instructions comprises a similar free range in the form of an unused bit at a given position, in the sense that this bit has the same value for each instruction. The unused bit is meaningless. Such an unused bit can be used to identify the frequently occurring instruction rather than using the entire opcode for this purpose. In that case, the opcode of the frequently occurring instruction becomes available as a free range. The unused bit is given up, as it were, as a free range in exchange for the aforementioned opcode, which constitutes a larger free range. Such an exchange may be assimilated with entropy encoding.

As yet another example, let it be assumed that the machine code MC comprises at least one type of instruction that comprises a particular set of bits, which constitutes a so-called field, for specifying a particular value in a range of values. The field concerned may comprise, for example, 16 bits. Let it be assumed that 8-bit values frequently occur in the field concerned. In case the field specifies an 8-bit value, there are effectively 8 bits that are unused. These 8 unused bits will typically be the 8 most significant bits of the field whose value is 0. Let it be assumed that the instruction concerned, or an instruction associated therewith, comprises a free range in the form of one or more unused bits. A single bit of this free range can be used to indicate that the field concerned comprises an 8-bit value. Accordingly, the 8 bits of the field that are effectively unused become available as a free range.

Reformatting machine code instructions can thus create additional space for digital signature DS embedding. This can be advantageous because such reformatting may obviate the need for inclusion of dummy instructions, which has drawbacks as mentioned hereinbefore. However, reformatting machine code MC will typically require an inverse reformatting in a processor that needs to execute the machine code MC. Reformatted instructions may need to be cast into their original format.

The series of steps S1-S6 illustrated in FIG. 3 will first be carried out for a machine code portion MC-P that constitutes the start of the machine code MC. The series of steps S1-S6 will then repetitively be carried out causing the instruction block composer IBC to provide successive instruction blocks IB for successive portions MC-P of the machine code MC, under the control of the analyzer ANL. As described with reference to FIG. 1, a digital signature DS is generated for each instruction block IB and embedded therein on the basis of the free range indication FI, which the analyzer ANL provides. Accordingly, successive protected instruction blocks IBP are obtained, which collectively constitutes the protected machine code MC.

Figure 4:
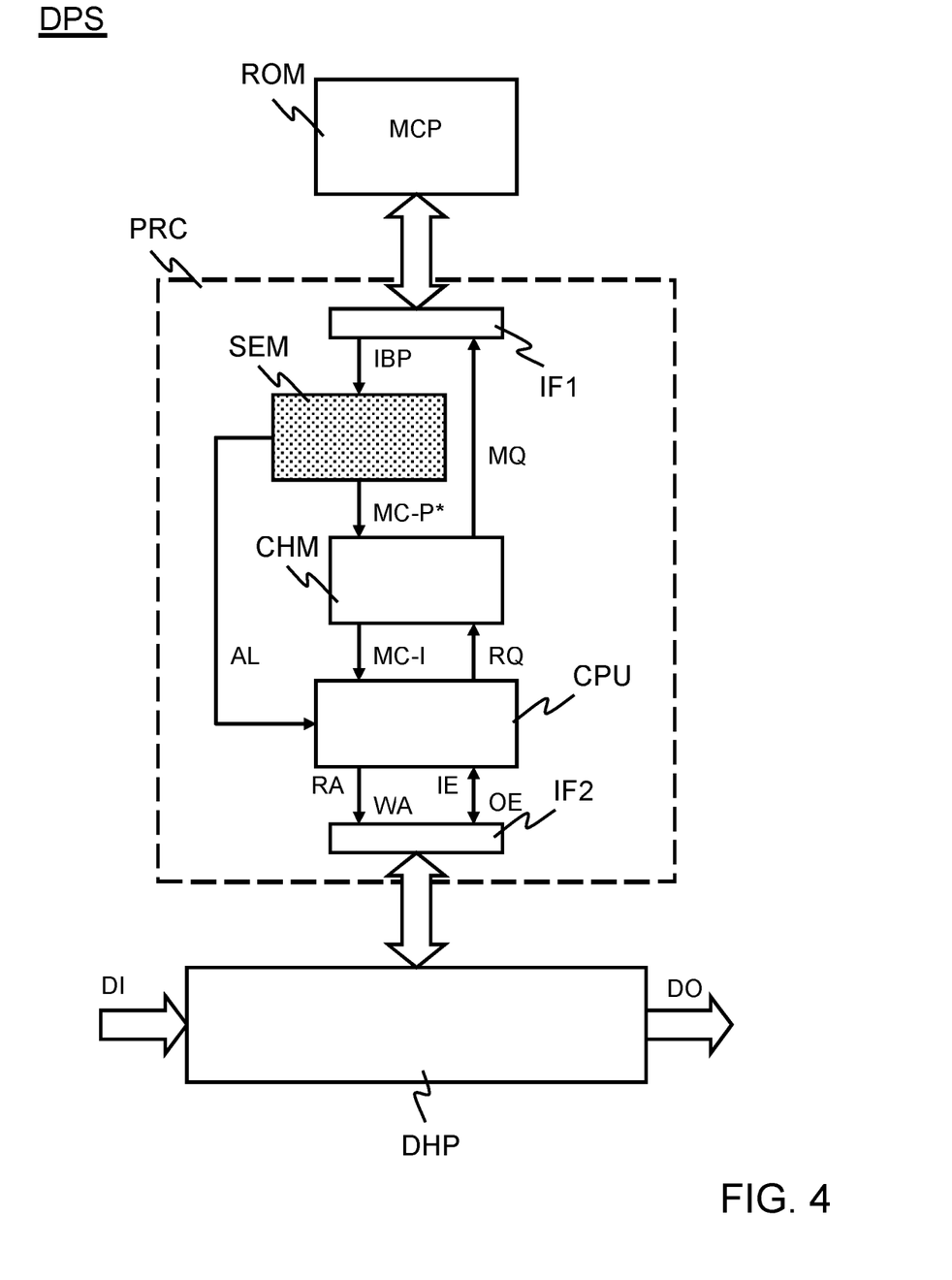
FIG. 4 is a block diagram that illustrates a data processing system arranged to execute machine code that the protected code generator has produced.

FIG. 4 illustrates a data processing system DPS that is arranged to execute a protected machine code MCP, which has been generated as described hereinbefore with reference to FIGS. 1 and 3. The data processing system DPS comprises a non-volatile memory ROM, a processor PRC, and a data-handling path DHP. The non-volatile memory ROM has been loaded with the protected machine code MCP. The data processing system DPS may be implemented in the form of, for example, an integrated circuit. As another example, the data processing system DPS may be implemented in the form of an apparatus that comprises an integrated circuit on which the non-volatile memory ROM and the processor PRC have been implemented.

The processor PRC comprises two interfaces IF1, IF2, one IF1 for the non-volatile memory ROM, the other interface IF2 being for the data-handling path DHP. The processor PRC further comprises a security module SEM, a cache memory CHM, and an instruction-executing circuit CPU. The data-handling path DHP may comprise a volatile memory for temporarily storing data and, optionally, one or more dedicated data processing circuits.

The data processing system DPS basically operates as follows. The data processing system DPS applies at least one data handling operation to input data DI so as to obtain output data DO. The input data DI and the output data DO may be in the form of, for example, data streams. The input data DI may be, for example, a digital representation of an input signal.

The processor PRC may directly carry out a data handling operation, which is defined by the protected machine code MCP. Alternatively, the processor PRC may control a data handling operation that a dedicated data processing circuit in the data-handling path DHP carries out. The processor PRC may also control several data handling operations in a time-multiplex fashion. In either case, the processor PRC executes the protected machine code MCP, which causes the processor PRC carried out data handling operations or control operations, or a combination of such operations.

In more detail, interface IF1 fetches a protected instruction block IBP, which forms part of the protected machine code MCP, from the non-volatile memory ROM. The interface IF1 fetches the protected instruction block IBP in response to a memory read request MQ, which the cache memory CHM issues. The interface IF1 transfers the protected instruction block IBP to be security module SEM. The protected instruction block IBP comprises a digital signature embedded therein, as explained hereinbefore.

The security module SEM checks authenticity and integrity of the protected instruction block IBP on the basis of the digital signature embedded therein. The security module SEM provides an alarm indication AL in case this check has a negative outcome. In that case, the processor PRC is prevented from any executing further instructions, that is, the processor PRC is blocked or reset, or both. For example, the instruction-executing circuit CPU may be blocked in response to the alarm indication AL. As another example, the security module SEM may generate an interrupt that is applied to one or more entities capable of blocking or stopping the processor PRC.

The security module SEM may further carry out an inverse reformatting operation in case a reformatting operation has been applied to generate the protected instruction block IBP as described hereinbefore with reference to FIGS. 1 and 3. In any case, the security module SEM provides a retrieved machine code portion MC-P* that comprises an original machine code portion MC-P to which one or more dummy instructions may have been added. In case no dummy instructions have been added, the retrieved machine code portion MC-P* illustrated in FIG. 4 corresponds with the machine code portion MC-P illustrated in FIG. 1, which is input to the code protector CPR.

The cache memory CHM temporarily stores the retrieved machine code portion MC-P*. The instruction-executing circuit CPU issues a cache read request RQ in order to retrieve a machine code instruction MC-I to be executed from the cache memory CHM. The cache read request RQ may comprise an address that designates a particular machine code instruction MC-I. The cache memory CHM may comprise a controller that maps this address to that of a particular memory cell in the cache memory CHM, which comprises the machine code instruction MC-I concerned, or that issues a memory read request MQ in case the request machine code instruction MC-I is not present in the cache memory CHM.

The instruction-executing circuit CPU successively executes machine code instructions MC-I that are read from the cache memory CHM. The execution of a machine code instruction MC-I may involve issuing a data read address RA, or a data write address WA, to the data-handling path DHP via interface IF2. In the case of a data read address RA, the data-handling path DHP may provide an input data element IE to be processed, which reaches the instruction-executing circuit CPU via interface IF2. In the case of a data write address WA, the instruction-executing circuit CPU may provide an output data element OE, which is transferred to the data-handling path DHP via interface IF2.

In summary, the cache memory CHM and the instruction-executing circuit CPU operate in a manner that is substantially similar to the manner in which these entities would operate in a conventional data processing system. In a conventional data processing system, there would be no security module and a cache memory would directly retrieve ordinary, unprotected machine code portions from a non-volatile memory, in which the machine code MC illustrated in FIG. 1 would be stored.

Figure 5:
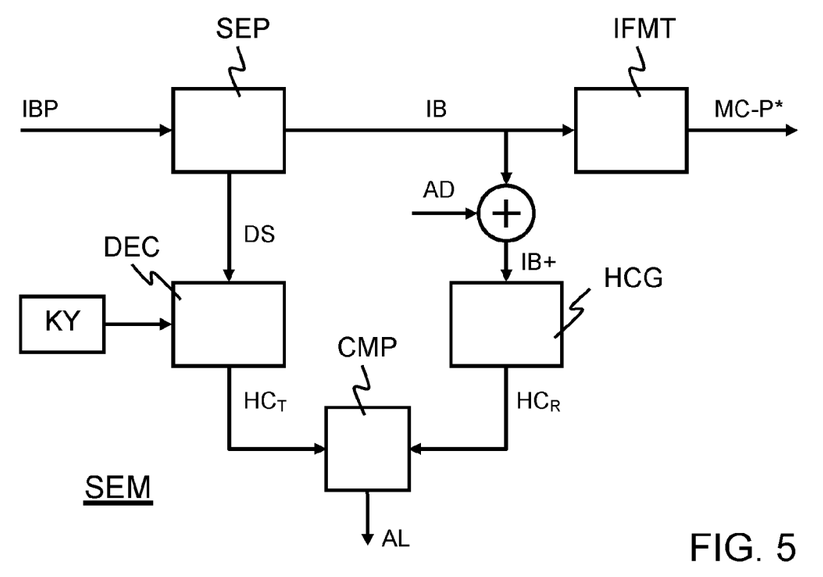
FIG. 5 is a block diagram that illustrates a security module that forms part of the data processing system.

FIG. 5 illustrates details of the security module SEM. The security module SEM comprises the following functional entities: a data separator SEP, an inverse reformatter IFMT, a signature decoder DEC, a hash code generator HCG, and a comparator CMP. Each of these functional entities may be implemented by means of, for example, a set of instructions that has been loaded into a programmable processor. In such a software-based implementation, the set of instructions defines operations that the functional entity concerned carries out, which will be described hereinafter. In this respect, FIG. 5 can be regarded to represent a method, whereby the data separator SEP represents a data separation step, the inverse reformatter IFMT represents an inverse reformatting step, the signature decoder DEC represents a signature decoding step, the hash code generator HCG represents a hash code generation step, and the comparator CMP represents a comparison step.

The security module SEM illustrated in FIG. 5 operates as follows. It is assumed that the security module SEM receives a protected instruction block IBP that has been generated as described hereinbefore with reference to FIGS. 1 and 3. It is further assumed that the protected instruction block IBP has not undergone any modification. The data separator SEP extracts and removes the digital signature DS from the protected instruction block IBP that is applied to the security module SEM. In effect, the data separator SEP splits the protected instruction block IBP into two parts: a first part comprising the digital signature DS, and a second part comprising the instruction block IB from which the digital signature DS has been stripped.

The inverse reformatter IFMT applies an inverse reformatting operation to the instruction block IB. The inverse reformatting operation undoes modifications introduced by the formatting operation in step S6 illustrated in FIG. 3, which is carried out by the instruction block composer IBC illustrated in FIG. 1. A reformatted instruction is returned to its original form, namely the form in which the instruction concerned occurred in the machine code MC illustrated in FIG. 1. Accordingly, the inverse reformatter IFMT provides a retrieved machine code portion MC-P*, which comprises an original machine code portion MC-P and one or more dummy instructions that may have been inserted. In principle, there is no need to remove these dummy instructions since these do not affect the operations that the processor PRC carries out.

The signature decoder DEC generates a target hash code $HC_T$ on the basis of the digital signature DS, which has been extracted from the protected instruction block IBP, and a key KY. This key KY has a given predefined relationship with the secret key SK illustrated in FIG. 1, which has been used to generate the digital signature DS. The key KY may be a public key in case an asymmetrical cryptographic scheme has been applied as mentioned hereinbefore. The target hash code $HC_T$ that is generated corresponds with the hash code HC that the hash code generator HCG illustrated in FIG. 1 has generated. This is because the digital signature DS has not undergone any modification, as assumed.

The hash code generator HCG illustrated in FIG. 5 applies the same hash function as the hash code generator HCG illustrated in FIG. 1. The hash code generator HCG applies the hash function to a complemented instruction block IB+. The complemented instruction block IB+ is obtained by adding a representative address AD to the instruction block IB. The representative address AD is the address of an instruction within the instruction block IB from which the instruction concerned will be executed. For example, an address counter within the processor PRC may provide the representative address AD.

The hash code generator HCG provides a retrieved hash code $HC_R$ by applying the hash function to the complemented instruction block IB+. The retrieved hash code $HC_R$ corresponds with the hash code HC that the hash code generator HCG illustrated in FIG. 1 has provided if the representative address AD within the data processing system DPS illustrated in FIG. 5 is the same as that within the protected code generator PCG illustrated in FIG. 1. Furthermore, it has been assumed that the instruction block IB has not undergone any modification as mentioned hereinbefore.

The comparator CMP compares the retrieved hash code $HC_R$, which is based on the instruction block IB and the representative address AD, with the target hash code $HC_T$, which is based on the digital signature DS. It has been assumed that the protected instruction block IBP has not undergone any modification, which implies that neither the digital signature DS, nor the instruction block IB, nor the representative address AD has undergone any modification. As a result, the retrieved hash code $HC_R$ will be identical to the target hash code $HC_T$. This correspondence of the aforementioned hash code HCs provides a guarantee for the authenticity and the integrity of the instruction block IB.

Conversely, the retrieved hash code $HC_R$ and the target has code will not correspond with each other if the protected instruction block IBP has been modified or if an address error has been introduced. That is, there will be a non-correspondence if anyone of the following elements has undergone a modification: the digital signature DS, the instruction block IB, and the representative address AD. In that case, the comparator CMP provides the alarm indication AL mentioned hereinbefore, which will block the processor PRC or will otherwise prevent further instructions from being executed. Processing comes to a halt because authenticity or integrity, or both, are not guaranteed.

Figure 6:
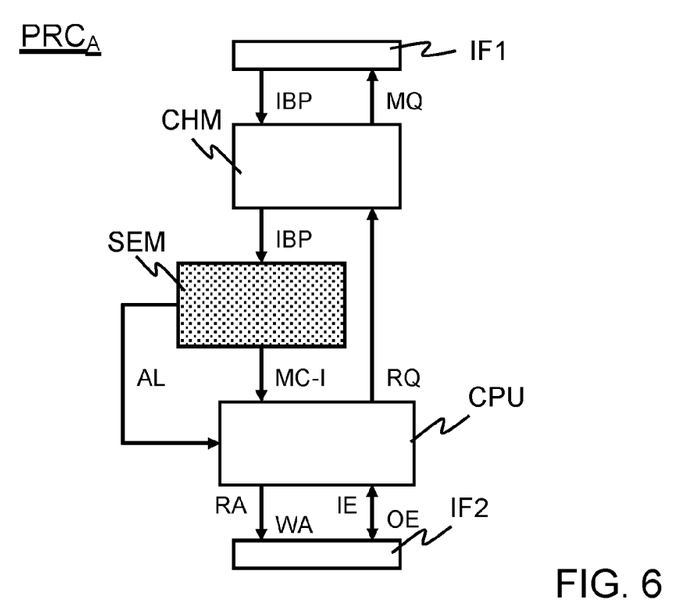
FIG. 6 is a block diagram that illustrates an alternative processor for the data processing system.

FIG. 6 illustrates an alternative processor $PRC_A$, which may replace the processor PRC in the data processing system DPS illustrated in FIG. 5. The alternative processor $PRC_A$ comprises similar entities: two interfaces IF1, IF2, one IF1 for a non-volatile memory ROM, the other interface IF2 being for a data-handling path DHP. The alternative processor $PRC_A$ further comprises a security module SEM, a cache memory CHM, and an instruction-executing circuit CPU. In the alternative processor PRC$_A$, the security module SEM is arranged between the cache memory CHM and the instruction-executing circuit CPU. This is a main difference with respect to the processor PRC illustrated in FIG. 5, wherein the security module SEM is arranged between interface IF1 and the cache memory CHM.

The entities in the alternative processor PRC$_A$ illustrated in FIG. 6 operate in a fashion that is substantially similar to those in the processor PRC illustrated in FIG. 5. The cache memory CHM temporarily stores a protected instruction block IBP that is retrieved from the non-volatile memory ROM. The security module SEM carries out an authenticity check and an integrity check on the protected instruction block IBP. The alternative processor PRC$_A$ is blocked in case this check provides a negative result. The security module SEM further transforms, as it were, the protected instruction block IBP into a sequence of machine code instructions MC-I. In executing the machine code instructions MC-I, the instruction-executing circuit CPU may apply data read and write addresses RA, WA to the data-handling path DHP via interface IF2 for the purpose of transferring input data elements IE and output data elements OE, respectively.

In summary, in the alternative processor PRC$_A$ illustrated in FIG. 6, an authenticity and integrity check is carried out between the cache memory CHM and instruction-executing circuit CPU, whereas, in the processor PRC illustrated in FIG. 5, this check is carried out at an earlier stage between the non-volatile memory ROM and the cache memory CHM. Both schemes have advantages and drawbacks.

An advantage of the scheme illustrated in FIG. 5, which may be designated as "checking upon cache refills", is that the scheme is a relatively simple to implement. This is particularly true in case protected instruction blocks IBP have a given fixed size that corresponds with that of a line in the cache memory CHM. For example, in case of a line size of 8 instructions, protected instruction blocks IBP preferably comprise 8 instructions. The processor PRC illustrated in FIG. 5 can be implemented in a relatively cost efficient fashion on the basis of a conventional processor, which typically comprises a cache memory and an instruction-executing circuit. Such an implementation mainly involves adding a security module between the cache memory and the instruction-executing circuit.

An advantage of the scheme illustrated in FIG. 6, which may be designated as "checking just before execution", is that this scheme potentially provides a higher degree of protection. A hacker may succeed in modifying one or more instructions that are temporarily stored in the cache memory CHM. For example, the hacker may expose the processor PRC to relatively strong light, or another type of radiation, so as to modify a counter value in a program counter. This will provoke an undesired jump. The security module SEM in the alternative processor PRC$_A$ illustrated in FIG. 6 will detect such an undesired jump.

In contrast, the "checking upon cache refills" scheme, which is illustrated in FIG. 5, provides little protection against modifications of instructions that are temporarily stored in the cache memory CHM. This is because the authenticity and integrity check is carried out when instructions are written into the cache memory CHM, rather than when instructions are read from the cache memory CHM in order to be executed only shortly thereafter. This is an inherent drawback of the "checking upon cache refills scheme" illustrated in FIG. 5.

A drawback of the "checking just before execution" scheme, which is illustrated in FIG. 6, is that this scheme can be relatively complicated to implement. The instruction-executing circuit CPU will generally have to be specifically adapted to operate under this scheme. That is, it will generally not be possible to implement the "checking just before execution" scheme with an exact copy of an instruction-executing circuit CPU from a conventional processor. Adaptations may be required.

Furthermore, the "checking just before execution" scheme will typically require protected instruction blocks IBP that may be relatively complicated to form. A protected instruction block IBP for this scheme should typically comprise instructions that are executed consecutively, one after the other. A branch instruction should not occur in the protected instruction block IBP, except for a branch instruction that is last in sequence. Such constraints may complicate implementations of protected code generation, as well as protected code execution. Moreover, protected instruction blocks IBP will typically vary in size depending on where branch instructions occur in the machine code MC. In summary, there will generally be a trade-off between degree of complexity and degree of protection.

CONCLUDING REMARKS

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to software protection. For example, the invention may be applied to in communication devices, such as, for example cellular phones, for protecting software that manages access to features that are subject to payment. As another example, the invention may be applied in content rendering devices, such as, for example, so-called Blu ray devices, for protecting software implementing digital rights management. Software that has been protected in accordance with the invention may be stored in any type of medium. The non-volatile memory ROM illustrated in FIG. 4 is merely an example. For example, protected software may be stored in a volatile memory or a medium that is optically recordable or magnetically recordable, or otherwise.

There are numerous ways of protecting software in accordance with the invention. Protective code can be generated for only a particular part of a program, whereby the protective code is embedded in this part only. For example, the series of steps S1-S6 illustrated in FIG. 3 may be applied to only a particular part of the machine code MC, which is stored in data storage space DST2 illustrated in FIG. 1.

It is possible to directly embed a protective code in a group of machine code instructions, without modifying these instructions and without inserting any dummy instructions. For example, referring to FIG. 1, the instruction block composer IBC may be arranged to provide respective instruction blocks IB that are exact copies of respective machine code portions MC-P. That is, step S4 illustrated in FIG. 3, in which dummy instructions are inserted, and step S5, in which machine code instructions are reformatted, may be dispensed with, either jointly or individually. Dummy instructions may be added during compilation in order to ensure that there is sufficient free space in an instruction block. Referring to FIG. 1, the compiler CMP may add dummy instructions so that the instruction block composer IBC need not add any dummy instructions. An advantage of this approach is that address recalculation can be avoided, which reduces complexity and risk of errors.

Various other measures may be taken for ensuring that there is sufficient free space in an instruction block for embedding a protective code. For example, an instruction block may have a size, in terms of number of instructions, which is dynamically defined. In case there is insufficient free space in an initial instruction block, instructions may be added until there is sufficient free space. As another example, a protective code may be adapted, in terms of size, so that the protective code fits, as it were, in a given instruction block. For example, in case a given instruction block can accommodate for 32 additional bits, a 32-bit protective code is generated for that given instruction block. To that end, for example, the code protector CPR illustrated in FIG. 1 may be modified so that the analyzer ANL controls the hash code generator HCG by selecting an appropriate hash code function on the basis of available free space.

There are numerous ways of generating a protective code. The protective code need not necessarily be in the form of a digital signature, which implies using an asymmetric cryptographic scheme with a public-private key pair. For example, the protective code may be generated by means of other cryptographic techniques, such as, for example, a cryptographic technique that uses symmetric key pairs rather than private-public key pairs. The protective code need not necessarily involve cryptography in case protection against medium errors is desired only. For example, the protective code may be a hash code. Furthermore, the protective code need not necessarily be generated from a data set that includes address information. For example, the code protector CPR illustrated in FIG. 1 may be modified so that the hash code HC and, consequently, the digital signature DS are generated from the instruction block IB only. That is, the representative address AD need not be taken into account.

The term "cache memory" should be understood in a broad sense. The term embraces any type of memory for storing an instruction block that has been protected in accordance with the invention. The term "digital signature" should be understood in a broad sense. The term embraces any type of code that allows a verification of integrity and authenticity.

Although a drawing shows different functional entities as different blocks, this by no means excludes implementations in which a single entity carries out several functions, or in which several entities carry out a single function. In this respect, the drawings are very diagrammatic. For example, referring to FIG. 1, the compiler CPL and the code protector CPR may be implemented by means of a single processor PRC.

There are numerous ways of implementing functional entities by means of hardware or software, or a combination of both. Although software-based implementations of these functional entities have been mentioned, hardware-based implementations are by no means excluded. Hardware-based implementations typically involve dedicated circuits, each of which has a particular topology that defines operations, which the dedicated circuit concerned carries out. Hybrid implementations are also possible in the sense that a system, or a functional entity comprises therein, comprises one or more dedicated circuits as well as one or more suitably programmed processor PRCs.

There are numerous ways of storing and distributing a block of instructions, that is, software, which allows protecting software in accordance with the invention. For example, software may be stored in a suitable medium, such as an optical disk or a memory circuit. A medium in which software is stored may be supplied as an individual product or together with another product, which may execute software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

The invention claimed is:

1. A method of protecting a program executed by a programmable circuit, the method comprising:
   an instruction block composition step in which an instruction block is provided on the basis of at least a portion of the program;
   a protective code generation step in which a protective code is generated that has a predefined relationship with the instruction block;
   an analysis step in which the instruction block is analyzed so as to identify free ranges within the instruction block that are neutral with respect to an execution of the instruction block, the free ranges comprising at least one of the following types: bit ranges and value ranges;
   a reformatting step in which a value indication is included in a free range that is available in a portion of the program that is subject to the instruction block composition step, the value indication marking that respective given bits of an instruction have been identified as a free range; and
   an embedding step in which the free ranges that have been identified are used for embedding the protective code in the instruction block, the protective code generation step comprising:
      a hash code generation step in which a hash code is generated from a data block that includes the instruction block; and
      a signature generation step in which a digital signature is generated from the hash code and a key,
      wherein, in the hash code generation step, the data block from which hash code is generated includes a data element representative of an address from which a given instruction in the instruction block should be executed, and at least one of a dummy instruction and an incremented jump instruction.

2. A method of protecting a program according to claim 1, wherein the instruction block composition step comprises:
   a reformatting step in which entropy coding is applied to instructions comprised in the program to be protected, so as to create free ranges within the instruction block, the entropy coding being performed by mapping operations that occur relatively frequently in the program to a relatively short variable length code, and by mapping operations that occur rarely in the program to a relatively long variable length code.

3. A method of protecting a program according to claim 1, wherein the value indication indicates that the instruction comprises a group of bits that each have a given value, the group of bits being identified as a free range.

4. A method of protecting a program according to claim 1, wherein the instruction block composition step comprises:
 a dummy instruction insertion step in which at least one dummy instruction included in the instruction block.

5. A method of protecting a program according to claim 1, the instruction block corresponding in size with a unit of access to a cache memory, which is associated with the programmable circuit that executes the program.

6. A method of protecting a program according to claim 1, the instruction block comprising a sequence of instructions that are to be carried out consecutively.

7. A non-transitory computer program product for a programmable processor, the computer program product comprising a block of instructions, which when loaded into the programmable processor, enables the programmable processor to carry out the method according to claim 1.

8. A system for protecting a program executed by a programmable circuit, the system comprising:
 a processor circuit having:
  an instruction block composer arranged to provide an instruction block on the basis of at least a portion of the program;
  a protective code generating module arranged to generate a protective code that has a predefined relationship with the instruction block;
  a code reformatting module arranged to include a value indication in a free range that is available in a portion of the program that is subject to the instruction block composer, the value indication marking that respective given bits of an instruction have been identified as a free range;
  an analysis module arranged to analyze the instruction block so as to identify free ranges within the instruction block that are neutral with respect to an execution of the instruction block, the free ranges comprising at least one of the following types: bit ranges and value ranges; and
  an embedding module arranged to use the free ranges that have been identified for embedding the protective code in the instruction block,
  the protective code generating module further being arranged to generate a hash code from a data block that includes the instruction block, and to generate a digital signature from the hash code and a key,
  wherein the data block from which the hash code is generated includes a data element representative of an address from which a given instruction in the instruction block should be executed, and at least one of a dummy instruction and an incremented jump instruction.

9. A method of processing a protected program that has been obtained by carrying out the method according to claim 1, the method of processing comprising:
 a data separation step in which the protective code, which has been embedded in the instruction block, is extracted; and
 a verification step in which it is verified whether the protective code has the predefined relationship with instruction block.

10. The method of claim 1, further comprising processing, using a processor, a protected program that has been obtained by carrying out the method according to claim 1, the processor comprising:
 a data separator arranged to extract the protective code, which has been embedded in the instruction block; and
 a verification step arranged to verify whether the protective code has the predefined relationship with instruction block.

11. A computer program product for a programmable processor, the computer program product comprising a block of non-transitory instructions, which when loaded into the programmable processor, causes the programmable processor to implement:
 an instruction block composer arranged to provide an instruction block on the basis of at least a portion of the program;
 a protective code generating module arranged to generate a protective code that has a predefined relationship with the instruction block;
 a code reformatting module arranged to include a value indication in a free range that is available in a portion of the program that is subject to the instruction block composer, the value indication marking that respective given bits of an instruction have been identified as a free range;
 an analysis module arranged to analyze the instruction block so as to identify free ranges within the instruction block that are neutral with respect to an execution of the instruction block, the free ranges comprising at least one of the following types: bit ranges and value ranges; and
 an embedding module arranged to use the free ranges that have been identified for embedding the protective code in the instruction block,
 the protective code generating module further being arranged to generate a hash code from a data block that includes the instruction block, and to generate a digital signature from the hash code and a key,
 wherein the data block from which hash code is generated includes a data element representative of an address from which a given instruction in the instruction block should be executed, and at least one of a dummy instruction and an incremented jump instruction.

\* \* \* \* \*